United States Patent
Lim et al.

(10) Patent No.: US 11,783,521 B2
(45) Date of Patent: *Oct. 10, 2023

(54) AUTOMATIC GENERATION OF PEOPLE GROUPS AND IMAGE-BASED CREATIONS

(71) Applicant: Google LLC, Mountain View, CA (US)

(72) Inventors: Dominick Lim, Mountain View, CA (US); Kristi Bohl, Mountain View, CA (US); Jason Chang, Mountain View, CA (US); Vidya Valmikinathan, Mountain View, CA (US); Taehee Lee, Mountain View, CA (US); Jeremy Zhu, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/956,909

(22) Filed: Sep. 30, 2022

(65) Prior Publication Data
US 2023/0018830 A1    Jan. 19, 2023

Related U.S. Application Data

(63) Continuation of application No. 17/252,707, filed as application No. PCT/US2020/039706 on Jun. 25, 2020, now Pat. No. 11,475,616.

(51) Int. Cl.
*G06T 11/60* (2006.01)
*G06V 20/00* (2022.01)
(Continued)

(52) U.S. Cl.
CPC .............. *G06T 11/60* (2013.01); *G06F 18/23* (2023.01); *G06V 20/00* (2022.01); *G06F 3/048* (2013.01);
(Continued)

(58) Field of Classification Search
CPC ....... G06T 11/60; G06T 2200/24; G06T 5/50; G06T 2207/20221; G06F 18/23;
(Continued)

(56) References Cited

U.S. PATENT DOCUMENTS 9,122,912 B1    9/2015 Briskin et al.
10,740,400 B2 *  8/2020 Bakir ................. G10L 13/08
(Continued)

FOREIGN PATENT DOCUMENTS

CN    110348274    10/2019
WO    2005/008519    1/2005
(Continued)

OTHER PUBLICATIONS

Kim, Jonghak et al., "Acquaintances Clustering for Social Relationship-Based Indexing of Digital Photos", IFIP Human-Computer Interaction Symposium. Springer, Berlin, Heidelberg, Dec. 31, 2010, 13 pages.
(Continued)

*Primary Examiner* — YuJang Tswei
(74) *Attorney, Agent, or Firm* — IP Spring

(57) ABSTRACT

Implementations described herein relate to methods, devices, and computer-readable media to generate and provide image-based creations. A computer-implemented method includes obtaining a plurality of episodes, each episode associated with a corresponding time period and including a respective set of images and person identifiers for each image. The method further includes forming a respective cluster for each episode that includes at least two person identifiers. The method further includes determining whether one or more person identifiers are included in less than a threshold number of clusters, and in response, removing the one or more person identifiers from the clusters that the one or more person identifiers that are included in. The
(Continued)

method further includes merging identical clusters to obtain a plurality of people groups that each include two or more person identifiers and providing a user interface that includes an image-based creation based on a particular people group.

20 Claims, 10 Drawing Sheets

(51) Int. Cl.
<table>
<tr><td>G06F 18/23</td><td>(2023.01)</td></tr>
<tr><td>G06F 3/048</td><td>(2013.01)</td></tr>
<tr><td>G06F 16/55</td><td>(2019.01)</td></tr>
<tr><td>G06F 16/58</td><td>(2019.01)</td></tr>
<tr><td>G06V 20/30</td><td>(2022.01)</td></tr>
<tr><td>G06V 20/40</td><td>(2022.01)</td></tr>
<tr><td>G06V 40/16</td><td>(2022.01)</td></tr>
<tr><td>G06Q 50/10</td><td>(2012.01)</td></tr>
<tr><td>G06F 16/75</td><td>(2019.01)</td></tr>
<tr><td>G06F 16/78</td><td>(2019.01)</td></tr>
<tr><td>G06F 18/23211</td><td>(2023.01)</td></tr>
<tr><td>G06T 5/50</td><td>(2006.01)</td></tr>
<tr><td>G06V 10/762</td><td>(2022.01)</td></tr>
</table>

(52) U.S. Cl.
CPC .......... *G06F 16/55* (2019.01); *G06F 16/5866* (2019.01); *G06F 16/75* (2019.01); *G06F 16/7867* (2019.01); *G06F 18/23211* (2023.01); *G06Q 50/10* (2013.01); *G06T 5/50* (2013.01); *G06T 2200/24* (2013.01); *G06T 2207/20221* (2013.01); *G06V 10/763* (2022.01); *G06V 20/30* (2022.01); *G06V 20/47* (2022.01); *G06V 40/173* (2022.01)

(58) Field of Classification Search
CPC ...... G06F 3/048; G06F 16/55; G06F 16/5866; G06F 16/75; G06F 16/7867; G06F 18/23211; G06V 20/00; G06V 20/30; G06V 20/47; G06V 40/173; G06V 10/763; G06Q 50/10
See application file for complete search history.

(56) References Cited

U.S. PATENT DOCUMENTS

<table>
<tr><td>11,151,386</td><td>B1</td><td>10/2021</td><td>Aggarwal et al.</td><td></td></tr>
<tr><td>2008/0298766</td><td>A1</td><td>12/2008</td><td>Wen et al.</td><td></td></tr>
<tr><td>2010/0150407</td><td>A1</td><td>6/2010</td><td>Cheswick</td><td></td></tr>
<tr><td>2010/0238191</td><td>A1</td><td>9/2010</td><td>Lee et al.</td><td></td></tr>
<tr><td>2011/0150340</td><td>A1*</td><td>6/2011</td><td>Gotoh</td><td>G06V 40/175<br>382/190</td></tr>
<tr><td>2013/0070975</td><td>A1*</td><td>3/2013</td><td>Begeja</td><td>G06F 16/784<br>382/118</td></tr>
<tr><td>2016/0034459</td><td>A1</td><td>2/2016</td><td>Larsen</td><td></td></tr>
<tr><td>2017/0124385</td><td>A1*</td><td>5/2017</td><td>Ganong</td><td>G06Q 30/0241</td></tr>
<tr><td>2019/0253431</td><td>A1</td><td>8/2019</td><td>Atanda</td><td></td></tr>
</table>

FOREIGN PATENT DOCUMENTS

<table>
<tr><td>WO</td><td>2010/047843</td><td>4/2010</td></tr>
<tr><td>WO</td><td>2011/089884</td><td>7/2011</td></tr>
</table>

OTHER PUBLICATIONS

KIPO, Notice of Office Action (with English translation) for Korean Patent Application No. 10-2021-7007314, dated Jan. 1, 2023, 16 pages.
EPO, Communication pursuant to Article 94(3) EPC in EP Application No. 20739832.2, dated Mar. 3, 2022, 5 Pages.
EPO, Communication Pursuant to Rules 161(1) and 162 EPC in EP Application No. 20739832.2, dated Jan. 18, 2021, 3 pages.
WIPO, International Search Report and Written Opinion in International Application No. PCT/US2020/039706, filed Jun. 25, 2020, dated Oct. 28, 2020, 11 Pages.
Apple, "Enjoy your Memories in Photos", accessed on Jun. 22, 2020 https://supportapple.com/en-in/HT207023, 4 pages.
EPO, Communication pursuant to Article 94(3) EPC in EP Application No. 20739832.2, dated Aug. 23, 2022, 4 pages.
JPO, Notice of Allowance (with English translation) for Japanese Patent Application No. 2021-514507, dated Sep. 27, 2022, 5 pages.
Kim, et al., "Acquaintances Clustering for Social Relationship-Based Indexing of Digital Photos", IFIP International Federation for Information Processing (Year 2010), 2010, 12 Pages.
Shimrit Ben-Yair, "Relive your best memories with new features from Google Photos", https://www.blog.google/products/photos/relive-your-best-memories-new-features-google-photos/, Sep. 12, 2019, 7 Pages.
USPTO, Non-final Office Action for U.S. Appl. No. 17/252,707, dated Feb. 24, 2022, 19 pages.
USPTO, Notice of Allowance for U.S. Appl. No. 17/252,707, dated Jun. 9, 2022, 8 pages.

\* cited by examiner

AUTOMATIC GENERATION OF PEOPLE GROUPS AND IMAGE-BASED CREATIONS

CROSS REFERENCE TO RELATED APPLICATIONS

This application is a continuation of U.S. patent application Ser. No. 17/252,707, filed Dec. 15, 2020 and titled "Automatic Generation of People Groups and Image-Based Creations," which is a § 371 national stage of International Patent Application No. PCT/US2020/039706, filed Jun. 25, 2020 and titled "Automatic Generation of People Groups and Image-Based Creations," the contents of both of which are incorporated by reference herein in their entirety.

BACKGROUND

Users of devices such as smartphones or other digital cameras capture and store a large number of photos and videos in their image libraries. Users utilize such libraries to view their photos and videos to reminisce about various events such as birthdays, weddings, vacations, trips, etc. Users may have large image libraries with thousands of images taken over a long time period.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations described herein relate to methods, devices, and computer-readable media to generate and provide image-based creations.

In some implementations, a computer-implemented method includes obtaining a plurality of episodes, wherein each episode is associated with a corresponding time period, and includes a respective set of images and person identifiers for each image in the respective set of images. The method further includes forming a respective cluster for each episode, wherein each cluster includes at least two person identifiers. The method further includes determining whether one or more person identifiers are included in less than a threshold number of clusters. The method further includes, if it is determined that the one or more person identifiers are included in less than the threshold number of clusters, removing the one or more person identifiers from the clusters that the one or more person identifiers that are included in. The method further includes, after the removing, merging identical clusters to obtain a plurality of people groups, wherein each people group includes two or more person identifiers. The method further includes providing a user interface that includes an image-based creation based on a particular people group of the plurality of people groups.

In some implementations, forming the respective cluster for each episode may include mapping all person identifiers that appear in at least one image in the set of images of the episode to the cluster, determining a number of images from the set of images of the episode that include a most frequent person identifier for the episode, and removing from the cluster person identifiers that are associated with less than a threshold number of images. In some implementations, the threshold number of images may be determined based on the number of images that include the most frequent person identifier for the episode.

In some implementations, the method may further include determining that at least one people group is associated with less than a threshold number of episodes. The method may further include, in response to determination that at least one people group is associated with less than the threshold number of episodes, combining the at least one people group with one or more other people groups. The one or more other people groups may each include a subset of the person identifiers included in the at least one people group. In these implementations, providing the user interface may be performed after merging the at least one people group.

In some implementations, merging the identical clusters may include associating, based on the clusters, a respective set of episodes to each of the plurality of people groups. In some implementations, providing the image-based creation may include selecting a subset of images for the image-based creation from the respective sets of images included in the episodes associated with the particular people group. Each image in the subset of images may depict persons that correspond to at least two of the two or more person identifiers included in the particular people group.

In some implementations, providing the user interface is performed in response to at least one of detecting that an image that matches the particular group was captured recently, detecting that a current date matches a date associated with the particular people group, or detecting an event that matches the particular people group.

In some implementations, providing the image-based creation may include selecting a subset of images for the image-based creation based on the particular people group. Each image in the subset of images may depict persons that correspond to at least two of the two or more person identifiers included in the particular people group. The method may further include generating the image-based creation based on the subset of images. Each image in the subset of images may depict persons that correspond to each of the two or more person identifiers included in the particular people group. In some implementations, each image in the subset of images may depict persons that correspond to at least two of the two or more person identifiers included in the particular people group. In some implementations, the subset of images may include images from at least two episodes of the plurality of episodes. In some implementations, the subset of images may be selected such that the subset provides one or more of: location diversity, pose diversity, or visual diversity.

Some implementations include a non-transitory computer-readable medium with instructions stored thereon that, when executed by a processor, cause the processor to perform operations that include obtaining a plurality of episodes, wherein each episode is associated with a corresponding time period, and includes a respective set of images and person identifiers for each image in the respective set of images. The operations further include forming a respective cluster for each episode, wherein each cluster includes at least two person identifiers. The operations further include determining whether one or more person identifiers are included in less than a threshold number of clusters and, if it is determined that the one or more person identifiers are included in less than the threshold number of clusters, removing the one or more person identifiers from the clusters that the one or more person identifiers that are included in. The operations further include merging identical clusters to obtain a plurality of people groups, wherein each people group includes two or more person identifiers. The operations further include providing a user interface that includes an image-based creation based on a particular people group of the plurality of people groups.

In some implementations, the operation of forming the respective cluster for each episode may include mapping all person identifiers that appear in at least one image in the set of images of the episode to the cluster, determining a number of images from the set of images of the episode that include a most frequent person identifier for the episode, and removing from the cluster person identifiers that are associated with less than a threshold number of images. In some implementations, the threshold number of images may be determined based on the number of images that include the most frequent person identifier for the episode.

In some implementations, the non-transitory computer-readable medium may have further instructions stored thereon that cause the processor to perform operations that include determining that at least one people group is associated with less than a threshold number of episodes, and in response to determination that at least one people group is associated with less than the threshold number of episodes, combining the at least one people group with one or more other people groups, wherein the one or more other people groups each include a subset of the person identifiers included in the at least one people group. In these implementations, the operation of providing the user interface may be performed after merging the at least one people group.

In some implementations, the operation of providing the image-based creation may include selecting a subset of images for the image-based creation based on the particular people group, wherein each image in the subset of images depicts persons that correspond to at least two of the two or more person identifiers included in the particular people group, and generating the image-based creation based on the subset of images.

In some implementations, the operation of merging the identical clusters may include associating, based on the clusters, a respective set of episodes to each of the plurality of people groups. In some implementations, providing the image-based creation may include selecting a subset of images for the image-based creation from the respective sets of images included in the episodes associated with the particular people group.

Some implementations may include a computing device that includes a processor and a memory coupled to the processor. The memory may have instructions stored thereon that, when executed by the processor, cause the processor to perform operations that include obtaining a plurality of episodes, wherein each episode is associated with a corresponding time period, and includes a respective set of images and person identifiers for each image in the respective set of images. The operations further include forming a respective cluster for each episode, wherein each cluster includes at least two person identifiers. The operations further include determining whether one or more person identifiers are included in less than a threshold number of clusters and, if it is determined that the one or more person identifiers are included in less than the threshold number of clusters, removing the one or more person identifiers from the clusters that the one or more person identifiers that are included in. The operations may further include, after the removing, merging identical clusters to obtain a plurality of people groups, wherein each people group includes two or more person identifiers. The operations further include providing a user interface that includes an image-based creation based on a particular people group of the plurality of people groups.

In some implementations, the operation of forming the respective cluster for each episode may include mapping all person identifiers that appear in at least one image in the set of images of the episode to the cluster, determining a number of images from the set of images of the episode that include a most frequent person identifier for the episode, and removing from the cluster person identifiers that are associated with less than a threshold number of images. In some implementations, the threshold number of images may be determined based on the number of images that include the most frequent person identifier for the episode.

In some implementations, the memory may have further instructions stored thereon that, when executed by the processor, cause the processor to perform operations that include determining that at least one people group is associated with less than a threshold number of episodes, and in response to determination that at least one people group is associated with less than the threshold number of episodes, combining the at least one people group with one or more other people groups. In some implementations, the one or more other people groups may each include a subset of the person identifiers included in the at least one people group. In these implementations, the operation of providing the user interface may be performed after merging the at least one people group.

In some implementations, the operation of providing the image-based creation may include selecting a subset of images for the image-based creation based on the particular people group, wherein each image in the subset of images depicts persons that correspond to at least two of the two or more person identifiers included in the particular people group, and generating the image-based creation based on the subset of images.

In some implementations, the operation of merging the identical clusters may include associating, based on the clusters, a respective set of episodes to each of the plurality of people groups. In some implementations, providing the image-based creation may include selecting a subset of images for the image-based creation from the respective sets of images included in the episodes associated with the particular people group.

DETAILED DESCRIPTION

Figure 1:
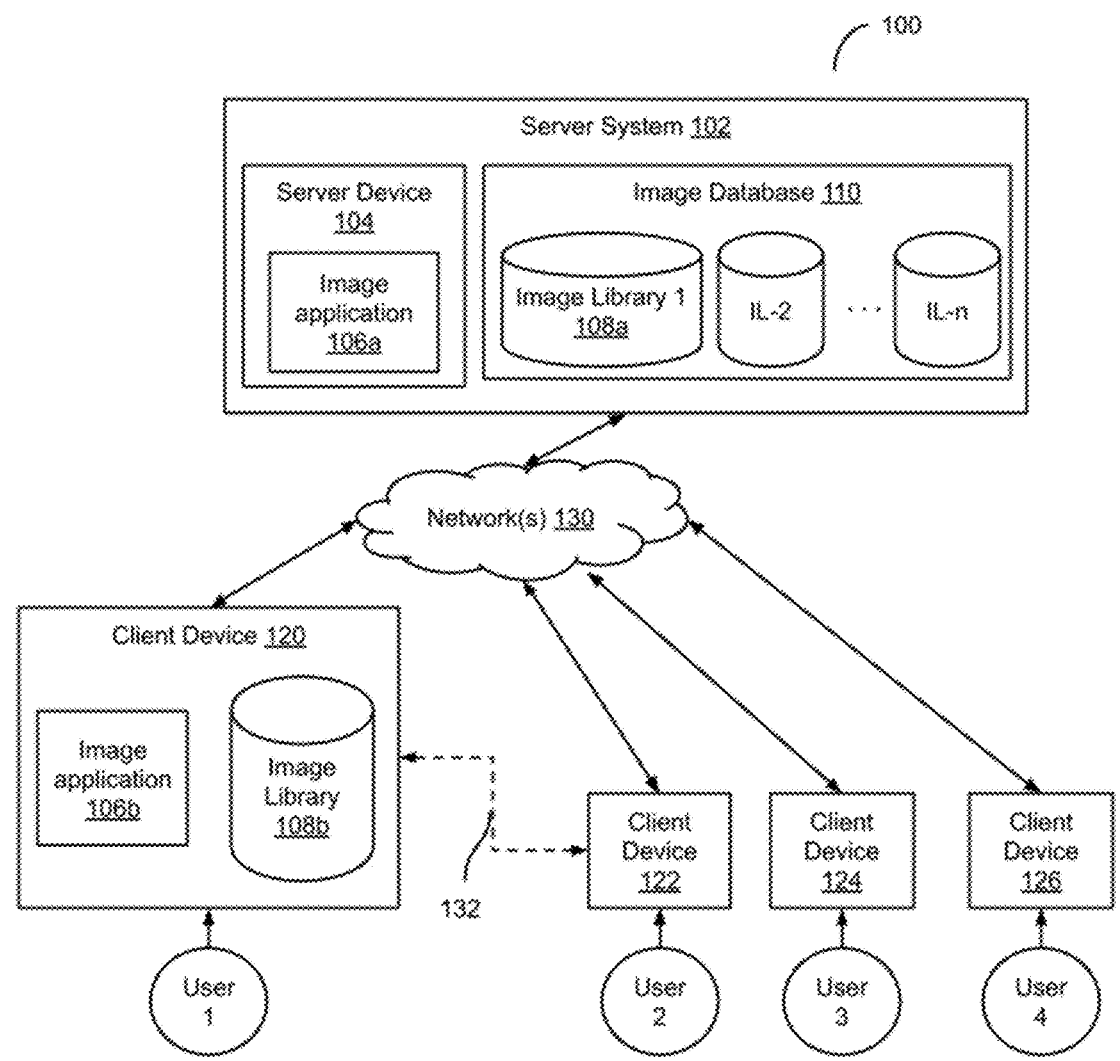
FIG. 1 is a block diagram of an example network environment which may be used for one or more implementations described herein.

This disclosure relates to automatically determining significant people groups based on a user's image library and providing image-based creations for such people groups at an appropriate time. For example, a user may have an image library that includes thousands of photos, taken over a long period of time, e.g., over the user's lifetime. Browsing such images may be tedious, as the user may encounter a large number of uninteresting or duplicate images. Further, while search functionality may enable a user to identify images that meet certain criteria (e.g., images captured in a particular time period, images that depict a particular person, etc.), the user needs to explicitly formulate and perform a search to view images.

In a library of images, a subset of the persons depicted may be significant and important to the user. For example, such a subset may include the user's immediate family (e.g., spouse, children, parents), pets, close friends, etc. Users are more likely to be interested in images of such a subset of persons, since these are the important people in their lives.

Techniques are described herein to automatically identify significant people groups in a user's image library, e.g., groups of two or more people that each have a significant relationship with the user. The described techniques are performed with specific user permission to access user data for such automatic identification. In some implementations, the user's image library may be divided into multiple episodes, such that each episode may correspond to an event (e.g., a major event such as a wedding or a graduation, or a smaller event such as a hiking trip). Per techniques described herein, episodes in the user's image library are analyzed to identify a person cluster associated with each episode. Persons that do not appear sufficiently frequently in an episode or that appear in only a small number of episodes are removed from the person clusters, and any duplicate person clusters are merged, to obtain people groups.

In some implementations, if a plurality of people groups are identified, e.g., based on the triggering condition, a subset of the people groups may be utilized to generate the image-based creation. For example, larger people groups may be utilized for image-based creations rather than smaller groups. If multiple people groups of the same size are determined, the people groups may be ranked based on the person identifiers, based on whether recent images included the people group, based on a relative frequency of each people group in the user's library, etc.

Based on the identified people groups, image-based creations such as slide shows, collages, image albums, etc. are automatically generated. A user interface is provided to the user to view the image-based creations. Image-based creations may be generated at opportune times (e.g., near upcoming events, periodically when the user browses images in the image library, etc.) and may be provided via a user interface. The described techniques thus automatically identify significant people groups in an image library and provide user interfaces that enable a user to view image-based creations for such people groups.

FIG. 1 illustrates a block diagram of an example network environment 100, which may be used in some implementations described herein. In some implementations, network environment 100 includes one or more server systems, e.g., server system 102 in the example of FIG. 1, and a plurality of client devices, e.g., client devices 120-126, each associated with a respective user of users U1-U4. Each of server system 102 and client devices 120-126 may be configured to communicate with a network 130.

Server system 102 can include a server device 104 and an image database 110. In some implementations, server device 104 may provide image application 106a. In FIG. 1 and the remaining figures, a letter after a reference number, e.g., "106a," represents a reference to the element having that particular reference number. A reference number in the text without a following letter, e.g., "106," represents a general reference to embodiments of the element bearing that reference number.

Image database 110 may be stored on a storage device that is part of server system 102. In some implementations, image database 110 may be implemented using a relational database, a key-value structure, or other type of database structure. In some implementations, image database 110 may include a plurality of partitions, each corresponding to a respective image library for each of users U1-U4. For example, as seen in FIG. 1, image database 110 may include a first image library (image library 1, 108a) for user U1, and other image libraries (IL-2, IL-3, . . . , IL-n) for various other users. While FIG. 1 shows a single image database 110, it may be understood that image database 110 may be implemented as a distributed database, e.g., over a plurality of database servers. Further, while FIG. 1 shows a plurality of partitions, one for each user, in some implementations, each image library may be implemented as a separate database.

Image library 108a may store a plurality of images associated with user U1, metadata associated with the plurality of images, and one or more other database fields, stored in association with the plurality of images. Access permissions for image library 108a may be restricted such that user U1 can control how images and other data in image library 108a may be accessed, e.g., by image application 106, by other applications, and/or by one or more other users. Server system 102 may be configured to implement the access permissions, such that image data of a particular user is accessible only as permitted by the user.

An image as referred to herein can include a digital image having pixels with one or more pixel values (e.g., color values, brightness values, etc.). An image can be a still image (e.g., still photos, images with a single frame, etc.), a dynamic image (e.g., animations, animated GIFs, cinemographs where a portion of the image includes motion while other portions are static, etc.), or a video (e.g., a sequence of images or image frames that may optionally include audio). An image as used herein may be understood as any of the above. For example, implementations described herein can be used with still images (e.g., a photograph, or other image), videos, or dynamic images.

Network environment 100 also can include one or more client devices, e.g., client devices 120, 122, 124, and 126, which may communicate with each other and/or with server system 102 via network 130. Network 130 can be any type of communication network, including one or more of the Internet, local area networks (LAN), wireless networks, switch or hub connections, etc. In some implementations, network 130 can include peer-to-peer communication between devices, e.g., using peer-to-peer wireless protocols (e.g., Bluetooth®, Wi-Fi Direct, etc.), etc. One example of peer-to-peer communication between two client devices 120 and 122 is shown by arrow 132.

In various implementations, users U1, U2, U3, and U4 may communicate with server system 102 and/or each other using respective client devices 120, 122, 124, and 126. In some examples, users U1, U2, U3, and U4 may interact with each other via applications running on respective client devices and/or server system 102 and/or via a network service, e.g., a social network service or other type of network service, implemented on server system 102. For example, respective client devices 120, 122, 124, and 126 may communicate data to and from one or more server systems, e.g., server system 102.

In some implementations, the server system 102 may provide appropriate data to the client devices such that each client device can receive communicated content or shared content uploaded to the server system 102 and/or a network service. In some examples, users U1-U4 can interact via image sharing, audio or video conferencing, audio, video, or text chat, or other communication modes or applications.

A network service implemented by server system 102 can include a system allowing users to perform a variety of communications, form links and associations, upload and post shared content such as images, text, audio, and other types of content, and/or perform other functions. For example, a client device can display received data such as content posts sent or streamed to the client device and originating from a different client device via a server and/or network service (or from the different client device directly), or originating from a server system and/or network service. In some implementations, client devices can communicate directly with each other, e.g., using peer-to-peer communications between client devices as described above. In some implementations, a "user" can include one or more programs or virtual entities, as well as persons that interface with the system or network.

In some implementations, any of client devices 120, 122, 124, and/or 126 can provide one or more applications. For example, as shown in FIG. 1, client device 120 may provide image application 106*b*. Client devices 122-126 may also provide similar applications. Image application 106*a* may be implemented using hardware and/or software of client device 120. In different implementations, image application 106*a* may be a standalone client application, e.g., executed on any of client devices 120-124, or may work in conjunction with image application 106*b* provided on server system 102.

Image application 106 may provide various features, implemented with user permission, that are related to images. For example, such features may include one or more of capturing images using a camera, modifying the images, determining image quality (e.g., based on factors such as face size, blurriness, number of faces, image composition, lighting, exposure, etc.), storing images or videos in an image library 108, providing user interfaces to view images or image-based creations, etc.

In some implementations, with user permission, the features provided by image application 106 may include analyzing images to determine one or persons depicted in the images (e.g., using one or more user-permitted techniques such as face detection, face recognition, gait recognition, pose recognition, etc.) and to generate a person identifier for each person (e.g., humans, pets) depicted in images in image library 108. The person identifiers for each image may be stored in association with the image in image library 108. In some implementations, generating the person identifiers can further include obtaining a thumbnail representation of the person depicted in the image, e.g., a close-up of the person, obtained via zooming or cropping an image that depicts the user.

In some implementations, with user permission, image application 106 may analyze images to generate data and store such data in image library 108. For example, image application 106 may analyze the images and associated metadata (e.g., locations, timestamps, etc.) to group the images into a plurality of episodes. In some implementations, an episode may be associated with an event (e.g., a birthday or other celebration, a trip) or a particular time period. Image application 106 may (iteratively) analyze images in image library 108 to determine the plurality of episodes. Upon determining the episodes, image application 106 may update image library 108 to indicate an episode that each image in the image library is associated with.

While the foregoing description refers to a variety of features of image application 106, it will be understood that in various implementations, image application 106 may provide fewer or more features. Further, each user is provided with options to enable and/or disable certain features. Features of image application 106 are implemented specifically with user permission.

Client device 120 may include an image library 108*b* of user U1, which may be a standalone image library. In some implementations, image library 108*b* may be usable in combination with image library 108*a* on server system 102. For example, with user permission, image library 108*a* and image library 108*b* may be synchronized via network 130. In some implementations, image library 108 may include a plurality of images associated with user U1, e.g., images captured by the user (e.g., using a camera of client device 120, or other device), images shared with the user U1 (e.g., from respective image libraries of other users U2-U4), images downloaded by the user U1 (e.g., from websites, from messaging applications, etc.), screenshots, and other images.

In some implementations, image library 108*b* on client device 120 may include a subset of images in image library 108*a* on server system 102. For example, such implementations may be advantageous when a limited amount of storage space is available on client device 120.

In some implementations, image application 106 may enable a user to manage the image library. For example, a user may use a backup feature of image application 106*b* on a client device (e.g., any of client devices 120-126) to back up local images on the client device to a server device, e.g., server device 104. For example, the user may manually select one or more images to be backed up, or specify backup settings that identify images to be backed up. Backing up an image to a server device may include transmitting the image to the server for storage by the server, e.g., in coordination with image application 106*a* on server device 104.

In different implementations, client device 120 and/or server system 102 may include other applications (not shown) that may be applications that provide various types of functionality, e.g., calendar, address book, e-mail, web browser, shopping, transportation (e.g., taxi, train, airline reservations, etc.), entertainment (e.g., a music player, a video player, a gaming application, etc.), social networking (e.g., messaging or chat, audio/video calling, sharing images/video, etc.) and so on. In some implementations, one or more of the other applications may be standalone applications that execute on client device 120. In some implementations, one or more of the other applications may access a server system, e.g., server system 102, that provides data and/or functionality of the other applications.

A user interface on a client device 120, 122, 124, and/or 126 can enable the display of user content and other content, including images, image-based creations, data, and other content as well as communications, privacy settings, notifications, and other data. Such a user interface can be displayed using software on the client device, software on the server device, and/or a combination of client software and server software executing on server device 104, e.g., application software or client software in communication with server system 102. The user interface can be displayed by a display device of a client device or server device, e.g., a touchscreen or other display screen, projector, etc. In some implementations, application programs running on a server system can communicate with a client device to receive user input at the client device and to output data such as visual data, audio data, etc. at the client device.

For ease of illustration, FIG. 1 shows one block for server system 102, server device 104, image database 110, and shows four blocks for client devices 120, 122, 124, and 126. Server blocks 102, 104, and 110 may represent multiple systems, server devices, and network databases, and the blocks can be provided in different configurations than shown. For example, server system 102 can represent multiple server systems that can communicate with other server systems via the network 130. In some implementations, server system 102 can include cloud hosting servers, for example. In some examples, image database 110 may be stored on storage devices provided in server system block(s) that are separate from server device 104 and can communicate with server device 104 and other server systems via network 130.

Also, there may be any number of client devices. Each client device can be any type of electronic device, e.g., desktop computer, laptop computer, portable or mobile device, cell phone, smartphone, tablet computer, television, TV set top box or entertainment device, wearable devices (e.g., display glasses or goggles, wristwatch, headset, armband, jewelry, etc.), personal digital assistant (PDA), media player, game device, etc. In some implementations, network environment 100 may not have all of the components shown and/or may have other elements including other types of elements instead of, or in addition to, those described herein.

Other implementations of features described herein can use any type of system and/or service. For example, other networked services (e.g., connected to the Internet) can be used instead of or in addition to a social networking service. Any type of electronic device can make use of features described herein. Some implementations can provide one or more features described herein on one or more client or server devices disconnected from or intermittently connected to computer networks. In some examples, a client device including or connected to a display device can display content posts stored on storage devices local to the client device, e.g., received previously over communication networks.

Figure 2:
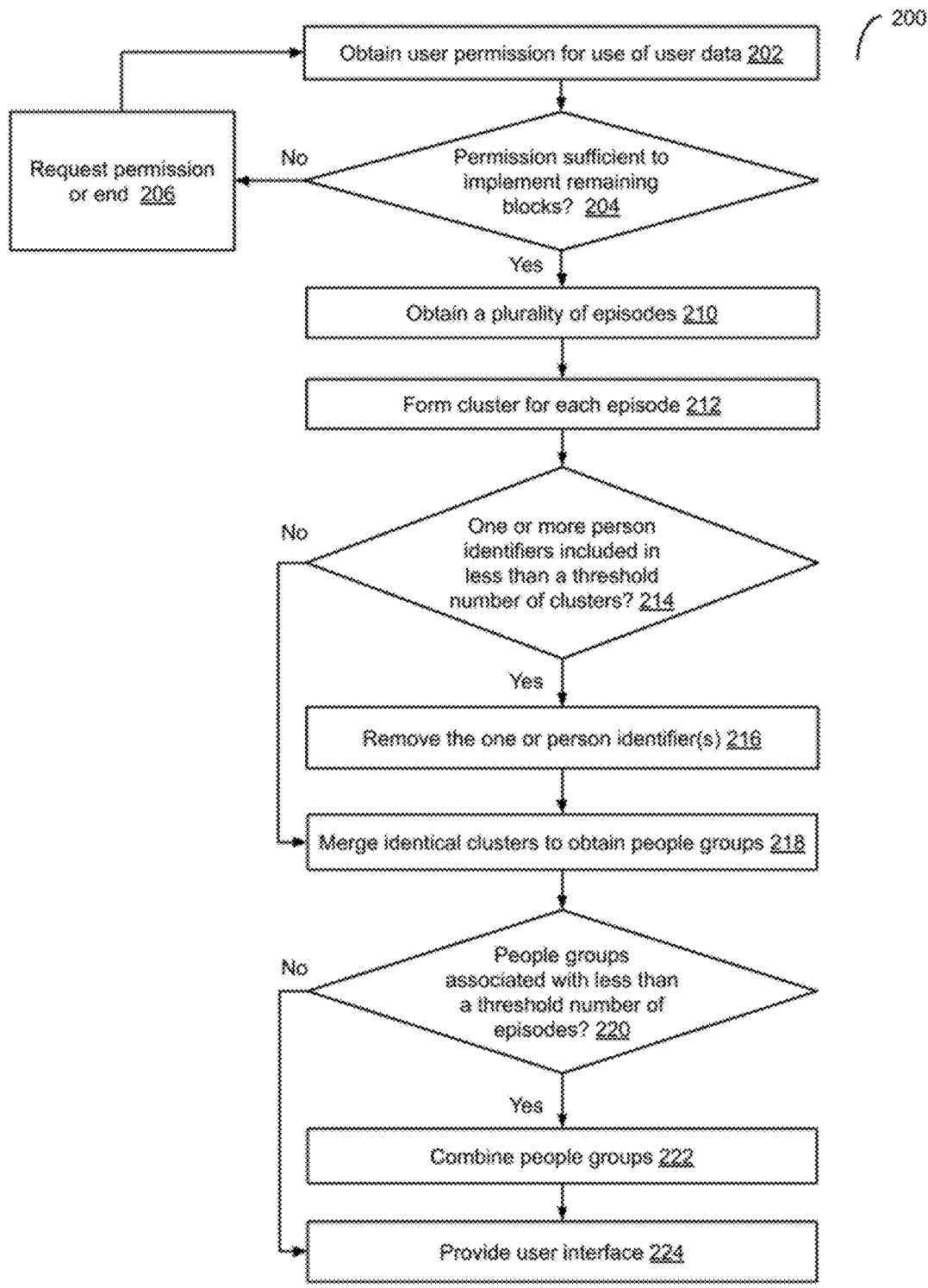
FIG. 2 is a flow diagram illustrating an example method to provide a user interface that includes an image-based creation, according to some implementations.

FIG. 2 is a flow diagram illustrating an example method 200 to provide a user interface that includes an image-based creation, according to some implementations. In some implementations, method 200 can be implemented, for example, on a server system 102 as shown in FIG. 1. In some implementations, some or all of the method 200 can be implemented on one or more client devices 120, 122, 124, or 126 as shown in FIG. 1, one or more server devices, and/or on both server device(s) and client device(s). In described examples, the implementing system includes one or more digital processors or processing circuitry ("processors"), and one or more storage devices (e.g., a database or other storage). In some implementations, different components of one or more servers and/or clients can perform different blocks or other parts of the method 200. In some examples, a first device is described as performing blocks of method 200. Some implementations can have one or more blocks of method 200 performed by one or more other devices (e.g., other client devices or server devices) that can send results or data to the first device.

In some implementations, the method 200, or portions of the method, can be initiated automatically by a system. In some implementations, the implementing system is a first device. For example, the method (or portions thereof) can be performed periodically, e.g., every few hours, daily, weekly, or at other suitable intervals. In some implementations, the method (or portions therefore) can be performed based on one or more particular events or conditions, e.g., a client device launching image application 106 capture of new images by a client device, upload of new images to a server system 102, a predetermined time period having expired since the last performance of method 200, and/or one or more other conditions occurring which can be specified in settings read by the method.

Method 200 may begin at block 202. In block 202, user permission is obtained to use user data in the implementation of method 200. For example, user data for which permission is obtained can include images stored on a client device (e.g., any of client devices 120-126) and/or a server device, image metadata, user data related to the use of an image management application, user responses to image-based creations, etc. The user is provided with options to selectively provide permission to access such user data. For example, a user may choose to provide permission to access all of the requested user data, any subset of the requested data, or none of the requested data. One or more blocks of the methods described herein may use such user data in some implementations. Block 202 is followed by block 204.

In block 204, it is determined whether the remainder of method 200 (blocks 210-224) as described herein can be implemented with the user-provided permissions, e.g., by accessing data as permitted by the user. If it is determined in block 204 that the permissions provided by the user in block 202 are insufficient, block 204 is followed by block 206, else block 204 is followed by block 210.

In block 206, user permission is requested to access user data. For example, if the user has denied permission for one or more portions of user data that may be used in blocks 210-224, a user interface may be provided for the user to provide permission for such portions of the user data. The user interface may indicate to the user how the data may be used and/or provide an indication that providing such permissions may benefit the user, e.g., by enabling provision of image-based creations. Alternatively, e.g., if the user dismisses the request for access to user data or otherwise indicates their denial of permission, the method ends at block 206, such that no user data is accessed. In such a case, blocks 210-224 are not performed.

If the permission provided by the user is sufficient, block 204 is followed by block 210. The remainder of the method, e.g., blocks 210-224 are performed with selective access to user data as permitted by the user. In some implementations, the user may be provided additional prompts to provide access to user data or to modify permissions.

In block 210, a plurality of episodes are obtained. For example, the episodes may be obtained from the user's image library, stored locally on a client device and/or a server device. In some implementations, each episode may be associated with a corresponding time period and may include a respective set of images.

For example, an episode may correspond to a particular event. Examples of events that can be associated with episodes include, e.g., a birthday, wedding, or other celebration; trips or activities such as a ski vacation, a hiking trip, a beach vacation, a game or concert, a family picnic, etc. An episode can span a small amount of time (e.g., a few hours or a day, as for a concert or birthday celebration) or relatively longer amounts of time (e.g., a multi-day ski vacation).

The set of images for an episode may include images that were taken within a time period that is associated with the episode. For example, the images associated with a hiking vacation may include images taken during that time period, including images of people climbing, walking on a trail eating/drinking, or engaging in other activities together, and/or other images (e.g., images of mountains, trees, etc.).

Each image may be associated with respective person identifiers. In some implementations, a person identifier may be a unique value, e.g., a database primary key or equivalent, that is associated with a particular person depicted in the image library of the user. For example, an image that depicts two people walking on a trail may be associated with a respective person identifier for each of the two people. With user permission, a unique person identifier may be associated with each person depicted in one or more images in the user's image library.

In some implementations, the person identifier may be associated with a name of the person, when available in the user's image library. In some implementations, the person identifier may be associated with a representative image or thumbnail for the person. It will be understood that for operations such as retrieving images or associating person identifiers with images, the unique identifier (data value) may be utilized. In the rest of this document, for ease of illustration, person identifier is used interchangeably to refer to the unique identifier (e.g., an alphanumeric or other type of data value), the name of the person, or the thumbnail of the person. In some implementations, persons may include humans as well as pets (e.g., when the image library has features to distinguish between different animals). For images that do not depict a person, no person identifier may be associated or a null identifier may be associated. Block 210 may be followed by block 212.

FIGS. 3A-3F illustrate different stages of obtaining people groups from episodes in an user's image library, according to some implementations. The remainder of the blocks of method 200 are described with additional reference to FIGS. 3A-3F.

Figure 3A:
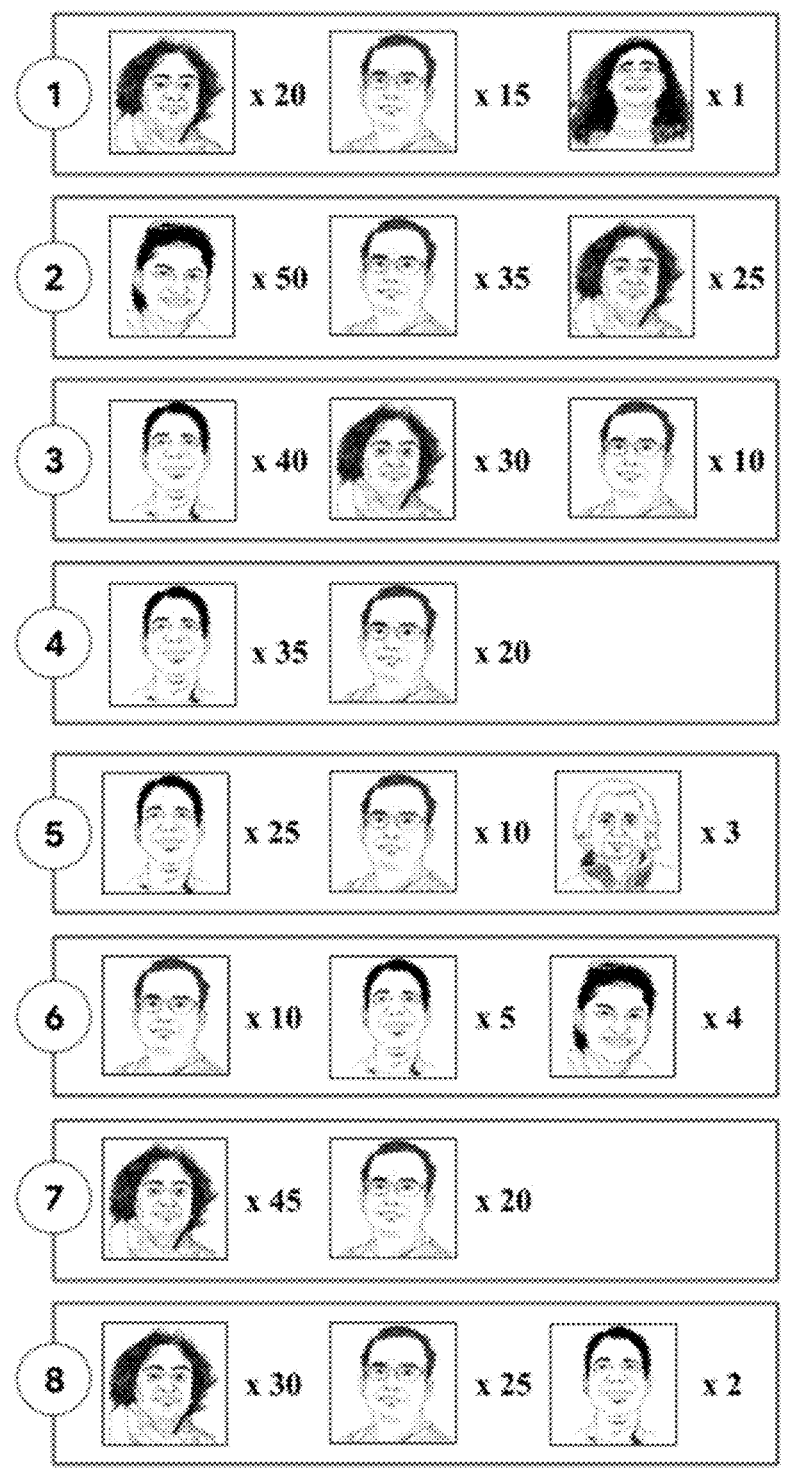
FIGS. 3A-3F illustrate different stages of obtaining people groups from episodes in an image library, according to some implementations.

In block 212, a respective cluster is formed for each episode. In FIGS. 3A-3D, eight clusters (and correspondingly, eight episodes) are identified by the numbers 1 through 8. In some implementations, forming a cluster may include mapping all person identifiers that appear in at least one image in the set of images of the episode to a cluster. For example, as shown in FIG. 3A, clusters 1, 2, 3, 5, 6, and 8 each include 3 person identifiers, and clusters 4 and 7 each include 2 person identifiers. In FIGS. 3A-3F, each person identifier is denoted by a respective face.

Figure 3B:
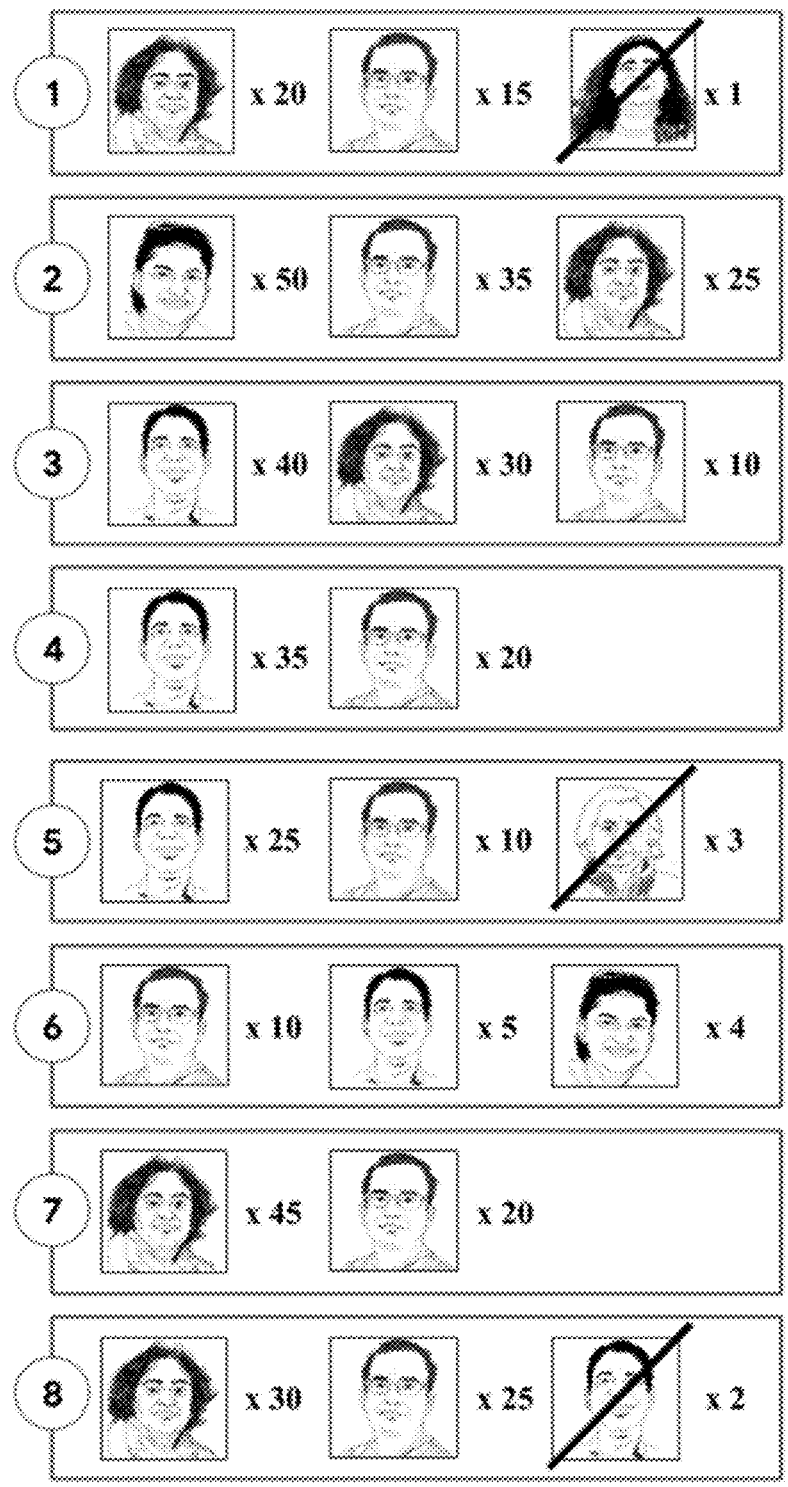
Figure 3C:
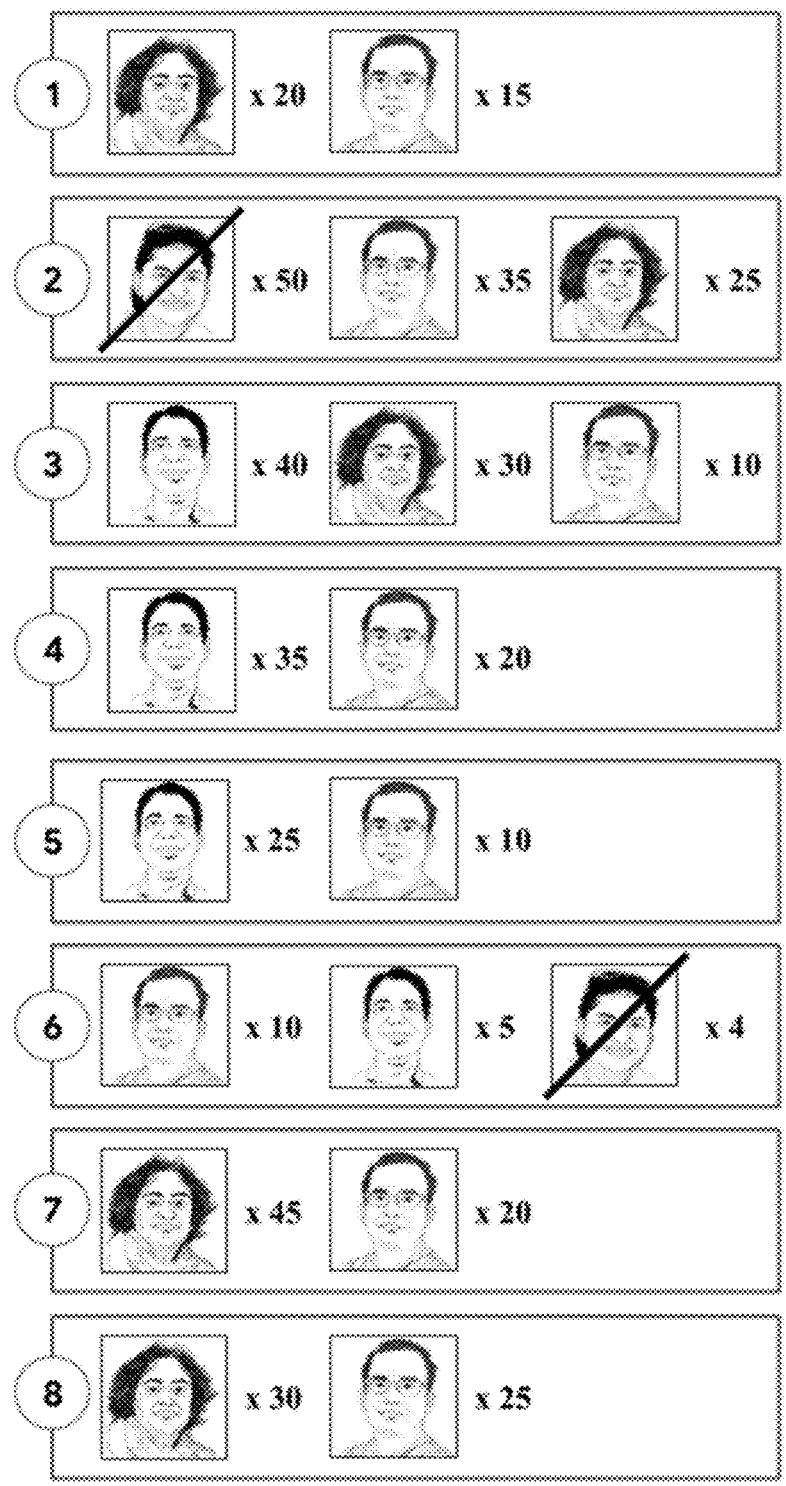

In each of FIGS. 3A-3C, the number next to each person identifier indicates the number of images from the set of images of the episode that the person identifier is associated with. A person identifier is associated with an image when the person corresponding to the person identifier is depicted in the image, e.g., as recognized by use of user-permitted person recognition techniques, e.g., face recognition, gait recognition, pose recognition, etc.

For the purpose of simplicity, the terms "person identifier X" and "person X" may be used interchangeably in this document. As can be seen in FIG. 3A, cluster 1 includes 20 images that include person A, 15 images that include person B, and 1 image that includes person C. Cluster 2 includes 50 images of person D, 35 images of person B, and 25 images of person A. Cluster 3 includes 40 images of person E, 30 images of person A, and 10 images of person B. Cluster 4 includes 35 images of person E and 20 images of person B. Cluster 5 includes 25 images of person E, 10 images of person B, and 3 images of person F. Cluster 6 includes 10 images of person B, 5 images of person E, and 4 images of person D. Cluster 7 includes 45 images of person A and 20 images of person B. Cluster 8 includes 30 images of person A, 25 images of person B, and 2 images of person E.

In some implementations, forming a cluster may further include determining a number of images from the set of images of the episode that include a most frequent person identifier for the episode. For example, for episode 1, the number of images is 20 (since person A is the most frequent person identifier).

In some implementations, forming a cluster may further include removing person identifiers that are associated with less than a threshold number of images from the cluster. In some implementations, the threshold number of images may be determined based on the number of images (e.g., for episode 1, 20) that include the most frequent person identifier for the episode. For example, for episode 1, it may be determined that the threshold number is 5 (less than 20% of 20) and person identifiers associated with less than the threshold number (e.g., person C) may be removed from cluster 1. If removal of a person identifier results in a cluster with a single person identifier, such a cluster is removed prior to further processing.

In different implementations, the threshold number may be chosen in different ways, e.g., as a percentage (20% of the number of images that includes the most frequent person, 30%, or other values). In some implementations, the threshold number may be chosen based on a maximum size for each cluster, e.g. to remove person identifiers associated with the lowest number of images in the cluster till the total number of person identifiers in the cluster is less than or equal to the threshold size. In some implementations, the threshold number may be chosen such that each cluster includes at least a minimum number of images, e.g., 3 images, 5 images, etc. for each person identifier associated with the cluster.

FIG. 3B illustrates that person identifier C is removed from cluster 1 and person identifier F is removed from cluster 5. For cluster 1, person C is associated with just one image of the cluster, which is less than the threshold number of images, e.g., which may be determined as 20% of 20=4. For cluster 5, person F is associated with 3 images of the cluster, which is less than the threshold number of images, e.g., which may be determined as 20% of 25=5, where 25 is the number of images that the most frequent person identifier (person B) of cluster 5 is included in.

Selection of the threshold number of images may ensure that person identifiers are depicted in the cluster relatively frequently, e.g., are important persons for the episode. For example, for an episode that includes a set of images from a hiking vacation that a group of people went on, it is likely that the persons that were part of the hiking group are depicted in the images of the episode more often than other persons such as other hikers, guides, etc. In another example, for an episode that includes a set of images from the wedding, individuals in the bridal party are likely the most important persons and such persons are likely to be depicted more often in the set of images of the episode. As such, removing person identifiers that are associated with less than the threshold number of images ensures that image-based creations based on the cluster include important persons from the episode.

Block 212 may be followed by block 214.

In block 214, it is determined whether one or more person identifiers are included in less than a threshold number of clusters. For example, as seen in FIG. 3C, person identifier D is identified as being included in two clusters (cluster 2 and cluster 6), which is less than a threshold number of clusters, e.g., four. In some implementations, the threshold number of clusters may be selected based on a total number of episodes (or a total number of episodes that have clusters with at least two person identifiers) in the user's image library. For example, for small image libraries (e.g., having 10 episodes, 20 episodes), the threshold number of clusters may be selected to be a relatively low value (e.g., 2, 3, etc.), while for large image libraries (e.g., having 50 episodes, 200 episodes, or even more episodes), the threshold number may be selected to a relatively high value (e.g., 5, 10, etc.).

Selection of the threshold number may be automatically based on the library size such that the use of the threshold number has a high likelihood of producing clusters that include persons that are depicted frequently in the user's image library and over a substantial period of time, e.g., persons that are relatively more important to the user. For example, persons that are more important to the user may include close family members such as spouse, children, parents, siblings, etc.; friends; a subset of co-workers; etc. while persons that are relatively less important to the user may include other persons such as persons that they met for meal, persons that were part of a tour group, persons accidentally captured in their images, etc.

If one or more person identifiers are included in less than the threshold number of clusters, block 214 is followed by block 216. Else, block 214 is followed by block 218.

In block 216, the one or more person identifiers identified in block 214 are removed from the clusters that such identifiers are included in. For example, FIG. 3C illustrates that person D is removed from cluster 2 and cluster 6. If removal of the one or more person identifiers results in a cluster with a single person identifier, such a cluster is removed prior to further processing. Block 216 may be followed by block 218.

Figure 3D:
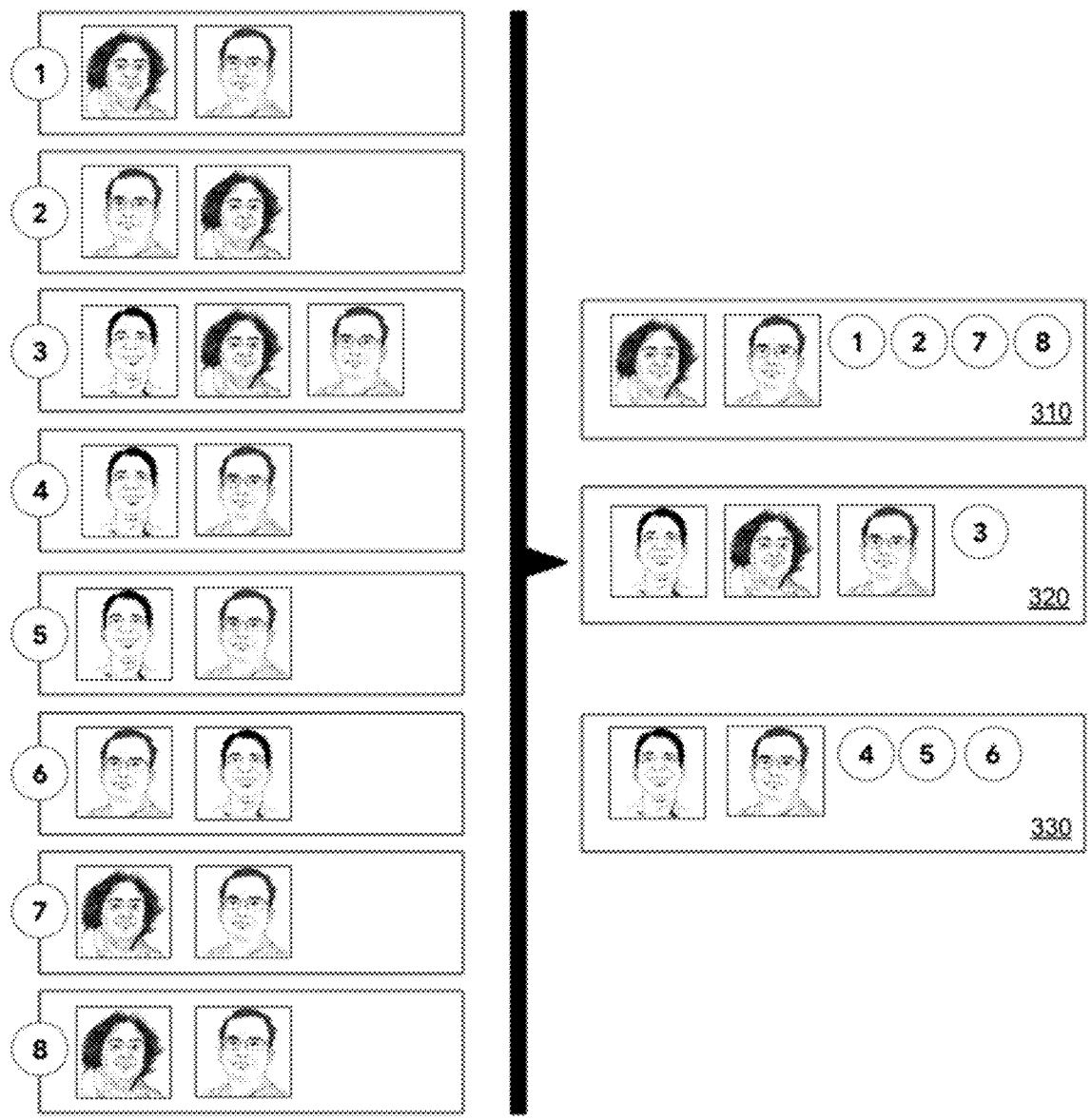

In block 218, identical clusters are merged to obtain a plurality of people groups. Each people group includes at least two person identifiers. For example, FIG. 3D illustrates that clusters 1, 2, 7, and 8 (each of which include persons A and B) are merged to obtain people group 310, and clusters 4, 5, and 6 (each of which include persons B and E) are merged to obtain people group 330. People group 320 is identical to unique cluster 3. In FIG. 3D, the episode numbers corresponding to each people group are shown next to the person identifiers for each people group.

In some implementations, merging the identical clusters may include associating a respective set of episodes (determined based on the clusters being merged) to each of the plurality of people groups. For example, as shown in FIG. 3D, episodes 1, 2, 7, and 8 are associated with people group 310 and episodes 4, 5, and 6 are associated with people group 330. Associating an episode with a people group enables selecting images from the episode when generating an image-based creation for the people group, as explained further with reference to block 224. Block 218 may be followed by block 220.

In block 220, which is performed after block 218, it is determined whether at least one people group is associated with less than a threshold number of episodes. For example, as seen in FIG. 3D, people group 320 is associated with a single episode (episode 3). In some implementations, the threshold number of episodes may be selected as two, three, or any other number. Selecting a higher threshold number of episodes may enable image-based creations with greater time diversity, since an image-based creation is based on the people groups and associated episodes, as explained with reference to block 224. Selecting a lower threshold number of episodes may enable generation of a greater number of image-based creations, e.g., by selecting the threshold as two, people groups associated with even two episodes can be used for an image-based creation, as explained with reference to block 224.

If it is determined in block 220 that at least one people group is associated with less than the threshold number of episodes, block 220 is followed by block 222. Else, block 220 is followed by block 224.

Figure 3E:
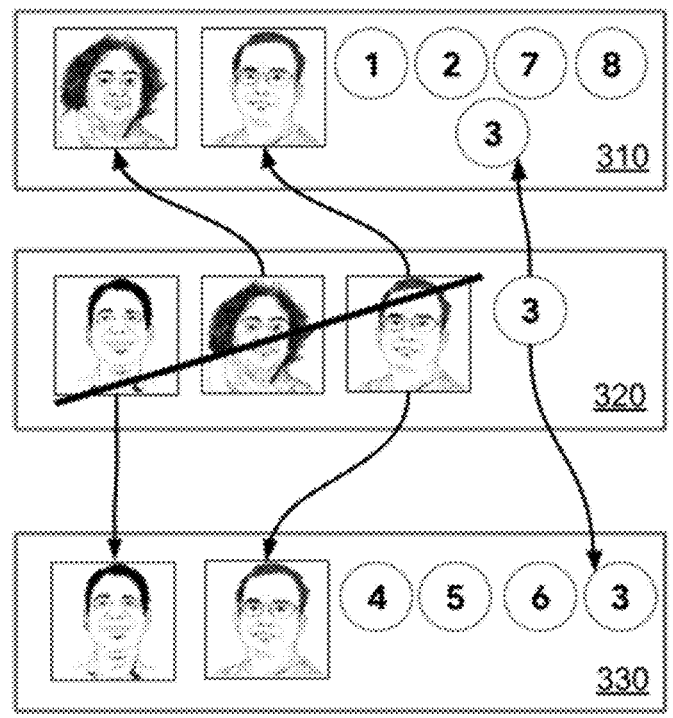

In block 222, the at least one people group (identified in block 220 as being associated with less than the threshold number of episodes) is combined with one or more other people groups. In some implementations, the one or more other people groups with which the at least one people group is combined each include a subset of the person identifiers included in the at least one people group. For example, FIG. 3E illustrates that people group 320 (associated with a single episode) is merged with people group 310 (which includes persons A and B) and with people group 330 (which includes persons B and E).

Figure 3F:
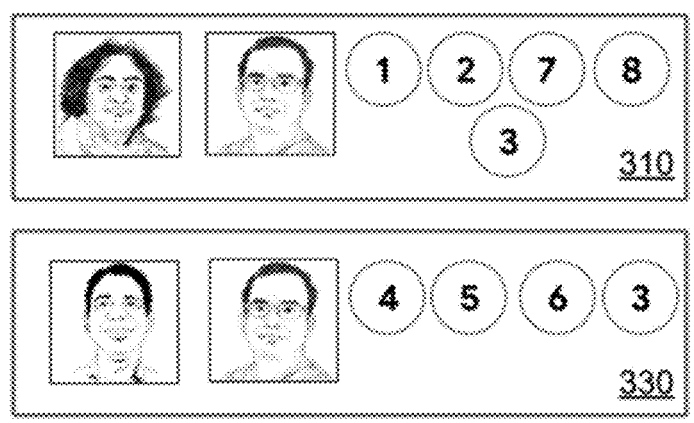

In some implementations, combining the people groups may include associating episodes associated with the at least one people group with the one or more other people groups with which the people group is combined. For example, after the combining, as shown in FIG. 3F, episode 3 is associated with people group 310 and with people group 330. Associating an episode with a people group enables selecting images from the episode when generating an image-based creation for the people group, as explained further with reference to block 224.

Block 222 may be followed by block 224. In some implementations, blocks 220 and 222 are optional. In these implementations, block 218 is followed by block 224.

In block 224, a user interface is provided that includes an image-based creation based on a particular people group of the plurality of people groups. For example, the user interface may be provided as an actionable user interface element displayed in an image application (e.g., image application 106), such that when the user selects the actionable user interface element, the corresponding image-based creation is displayed. In some implementations, providing the user interface may include causing instructions to display the user interface to be provided to a client device of the user (e.g., via an image application 106*b* on a client device 120, a web browser, etc.).

In some implementations, block 224 may be performed in response to detecting that at least one of the following triggering conditions is satisfied. An example triggering condition may be detecting that an image that matches the particular group was captured recently, e.g., since a previous time method 200 (or a sub-portion, e.g., block 224) was performed. Another example triggering condition may be detecting that a current date (at the time block 224 is performed) matches a date associated with the particular people group. For example, when the user's library includes a people group that is associated with periodic events (e.g., birthdays, wedding anniversaries, Thanksgiving, Christmas, or other holidays, etc.), block 224 may be performed such that the user interface with the image-based creation is provided at or near recurrence of the particular event. Another example triggering condition may be detecting an event that matches the particular people group. For example, a planned vacation (or an ongoing or just concluded vacation) with friends or family that are in the people group may be detected based on user-permitted data such as travel data, and block 224 may be performed accordingly.

In some implementations, images for the image-based creation may be downloaded to a client device (e.g., any of client devices 120-126) ahead of time, when a triggering condition is detected as eminent. For example, if a birthday is a trigger for an image-based creation based on a particular people group, the image-based creation may be generated in advance and downloaded and cached to the client device. Alternatively, or in addition, images for the people group may be downloaded and cached to the client device. Such downloading can ensure that the image-based creation is available (or can be generated by the client device) at the time the triggering condition is detected.

In some implementations, triggering may be suppressed based on a total number of people groups for the user's image library, e.g., for users with small image libraries with relatively small number of people groups, image-based creations may be provided less frequently than for users with libraries with large image libraries. This may have the benefit of providing image-based creations at a relatively regular interval (e.g., monthly) or at special moments (e.g., a birthday celebration), even in the case of few people groups being determined.

In some implementations, block 224 may be performed periodically, e.g., once a day, once a week, once a month, etc. In various implementations, block 224 may be performed in response to any combination of these or other triggering conditions.

In some implementations, the image-based creation may be generated based in part on the triggering condition for block 224. For example, if block 224 is performed in response to capture of a new image, the particular people group for the image-based creation may be a partial or exact match to the persons depicted in the image. In another example, when the image-based creation for a particular people group is generated periodically (e.g., once a month, once every summer, etc.), block 224 may be performed such that the subset of images selected in block 224 may include images from corresponding earlier periods. For example, if block 224 is performed every summer, selecting the subset of images may be performed such that images from episodes that are associated with prior summer seasons are selected and images from other seasons are excluded.

In some implementations, block 224 is performed such that the particular people group is not repeated frequently, e.g., that a different particular people group is selected each time block 224 is performed, or that similar image-based creations are not displayed in the user interface within a relatively short time period of time (e.g., a month, a quarter, etc.), or that image-based creations for a people group are not repeated unless new images are available for the people group.

In some implementations, providing the user interface may include selecting a subset of images for the image-based creation based on the particular people group. For example, the subset of images may be selected such that each image in the subset of images depicts persons that correspond to at least two of the two or more person identifiers included in the particular people group. In some implementations, the subset of images may be selected such that each image in the subset is an exact match to the people group. In other words, in these implementations, the subset of images may depict only the persons associated with person identifiers in the people group, and no other persons.

In some implementations, the subset of images may be selected such that each image in the subset is a match to the particular people group, but also includes one or more other persons. In other words, in these implementations, the subset of images may depict all the persons associated with person identifiers in the particular people group, and one or more other persons (that may or may not be in another people group). In some implementations, the subset of images may be selected such that the one or more other persons (that are not in the particular people group) are not part of any other people group.

In still further implementations, the subset of images may be selected such that each image in the subset is a partial match to the particular people group, e.g., includes at least two persons that are included in the two or more person identifiers of the particular people group, and optionally, includes one or more other persons. In other words, in these implementations, the subset of images may depict at least two of the persons associated with person identifiers in the people group, and optionally, one or more other persons (that may or may not be in another people group). In some of these implementations, the subset of images may be selected such that the one or more other persons (that are not in the particular people group) are not part of any other people group.

In some implementations, the subset of images may be selected such that the subset includes images from at least two episodes of the plurality of episodes. For example, such implementations may ensure that the image-based creation has temporal diversity. In other words, the image-based creation in such implementations depicts images from multiple different time periods or events for which the user's library includes images. In some implementations, e.g., when the image-based creation is to be generated with greater temporal diversity, the subset of images may be selected to include images from a greater number of episodes, e.g., three episodes, five episodes, ten episodes, etc. For example, a certain number of images may be selected from each time period, e.g., each quarter, each year, etc., or from each episode. In some implementations, episodes may be associated with respective episode significance scores, and the subset of images may be selected based on a particular number of high quality episodes, as determined based on the significance scores.

In some implementations, the subset of images may be selected based on the current date on which block 224 is performed. For example, when selecting the subset for the particular people group is performed at a regular interval (e.g., monthly) such that an image-based creation for the particular people group is provided once a month, the subset of images may be selected from images from the corresponding month in prior years, e.g., to provide an image-based creation of the form "A and B in July" for the people group. Other time periods such as seasons, quarters, etc. can also be used to select photos.

In some implementations, the subset of images may be selected such that the subset includes images that provide one or more of location diversity, pose diversity, or visual diversity. For example, when the user has provided permission to access locations associated with images in the user's image library (e.g., determined via image analysis or from image metadata), the subset of images is selected such that images from a plurality of locations (e.g., two, three, or more locations) are included in the subset.

In some implementations, when the user has provided permission to access pose data associated with images in the user's library, such data may be used to select the subset of images such that the images provide pose diversity. For example, pose data may indicate a pose of one or more persons (including the person identifiers associated with the particular people group) in the image, such as sitting, standing, dancing, jumping, bending, crouching, giving high-fives, etc.

In some implementations, when the user has provided permission to access other image-related data associated with images in the user's library, such data may be used to select the subset of images such that the images provide visual diversity. For example, such data may indicate data regarding objects depicted in the images, e.g., mountains, landmarks, ocean, flowers, animals, man-made objects (e.g., cake, bicycle, yacht, etc.) etc.

In some implementations, selecting the subset of images for the image-based creation may be based on the respective sets of images included in the episodes associated with the particular people group. For example, the subset of images may be selected such that each image in the subset depicts persons that correspond to at least two of the two or more person identifiers included in the particular people group and is from one of the episodes associated with the particular group.

In some implementations, the subset may be selected to exclude certain types of images, e.g., blurry images, images that depict faces in small size, images that do not meet a quality criterion, images that are inappropriate, images that have an image format that requires a special viewer (e.g., 360-degree images, 3D images, etc.), images with extreme aspect ratio (e.g., very wide or very tall images, unsuitable for a screen of a client device), images that are duplicates (or near duplicates) of an image is in the subset (e.g., depict the same objects, or same persons with similar pose, etc.), images that have been manually hidden by the user (e.g., images of a person that the user no longer has a relationship with), etc. Images that depict a person that has been manually hidden are not selected. Users are can also select to hide one or more time periods such that images from such time periods are excluded from image-based creations, e.g., by excluding episodes that occur within or overlapping with at least one of the one or more time periods. For example, the user may hide a particular date, date range, etc.

In some implementations, based on user provided permissions, any combination of the above factors, e.g., all or a subset of the person identifiers for the people group; inclusion or exclusion of other persons not in the people group; episodes from which the subset of images is selected; location, pose, or visual diversity; episodes associated with people groups; etc. may be utilized to select the subset of images for the image-based creation.

In some implementations, providing the image-based creation may further include generating the image-based creation based on the subset of images. For example, in some implementations, the image-based creation may be a slideshow of the subset of images. In these implementations, generating the image-based creation may include sequentially arranging the images in the slideshow, along with a respective display period for each image. For example, the images may be organized chronologically, based on the number of people depicted in each image, based on whether the image is an exact match to the particular people group, visual content of the image (e.g., smiling faces, pose, objects depicted in the image), location associated with the image, or other factors. In some implementations, the image-based creation may include an image collage, an image album, a movie (e.g., a short video), etc. In some implementations, the user interface may provide options for the user to share the image-based creation with other users, e.g., those in the people group, or others.

In various implementations, various blocks of method 200 may be combined, split into multiple blocks, performed in parallel, or performed asynchronously. In some implementations, one or more blocks of method 200 may not be performed. For example, in some implementations, blocks 214 and 216 may not be performed, and block 218 may be performed after block 214. In some implementations, block 224 may be performed multiple times, e.g., to select a subset of images for each of multiple people groups and generate multiple image-based creations that are provided in the user interface.

Method 200, or portions thereof, may be repeated any number of times using additional inputs. For example, in some implementations, method 200 may be performed when one or more new episodes are added to the user's image library. In these implementations, performing method 200 may include updating people groups that were previously obtained, or obtaining one or more additional people groups. In some implementations, blocks 210-222 may be performed at an initial time to obtain people groups, and block 224 may be performed at a later time, e.g., to provide the user interface on demand (e.g., when the user accesses image application 106).

Figure 4A:
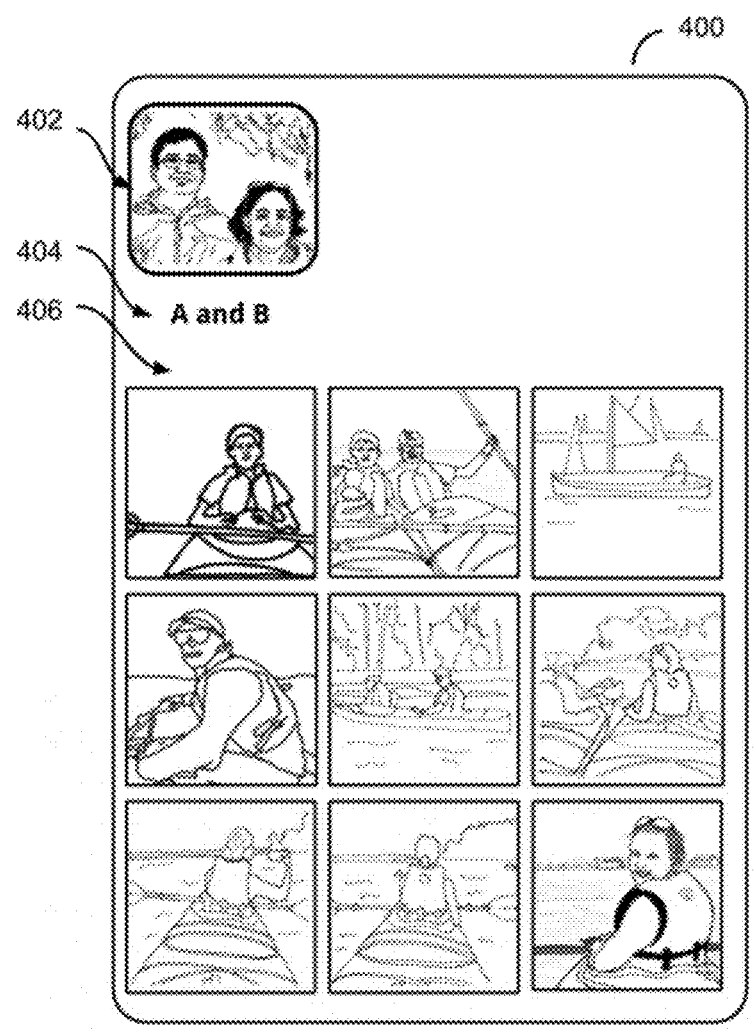
FIG. 4A illustrates an example user interface, according to some implementations described herein.

FIG. 4A illustrates an example user interface 400, according to some implementations described herein. User interface 400 may be displayed on a client device, e.g., any of client devices 120-126. In some implementations, user interface 400 may include an actionable user interface element 402, a title 404 for the actionable user interface element, and an image grid 406.

Image grid 406 may include a plurality of images of a user's image library. For simplicity, FIG. 4A shows a grid that includes 3 images per row. In various implementations, the grid may include any number of images per row, and may be scrollable. In some implementations, images in the image grid 406 may be arranged in reverse chronological order.

Actionable user interface (UI) element 402 may be associated with a corresponding image-based creation. In some implementations, when actionable user interface element 402 is generated based on a people group, as described with reference to FIGS. 2 and 3A-3F above, a title 404 for the actionable user interface element may include names associated with the person identifiers for the people group for which the image-based creation is generated. Actionable UI element 402 may include a particular image of the image-based creation. The particular image may be selected based on various factors, e.g., quality of the image (e.g., crispness, brightness, etc.), size and/or quality of the faces depicted in the image, recency of the image, image resolution, whether the image includes one or more smiling faces, if the image is a video, the length of the video, e.g., to not select short (e.g., <3 seconds) or long (e.g., >30 seconds) videos, etc. In some implementations, the particular image may be selected such that it includes only the persons associated with the people group. The particular image included in actionable UI element 402 may be referred to as a cover image for the image-based creation.

Figure 4B:
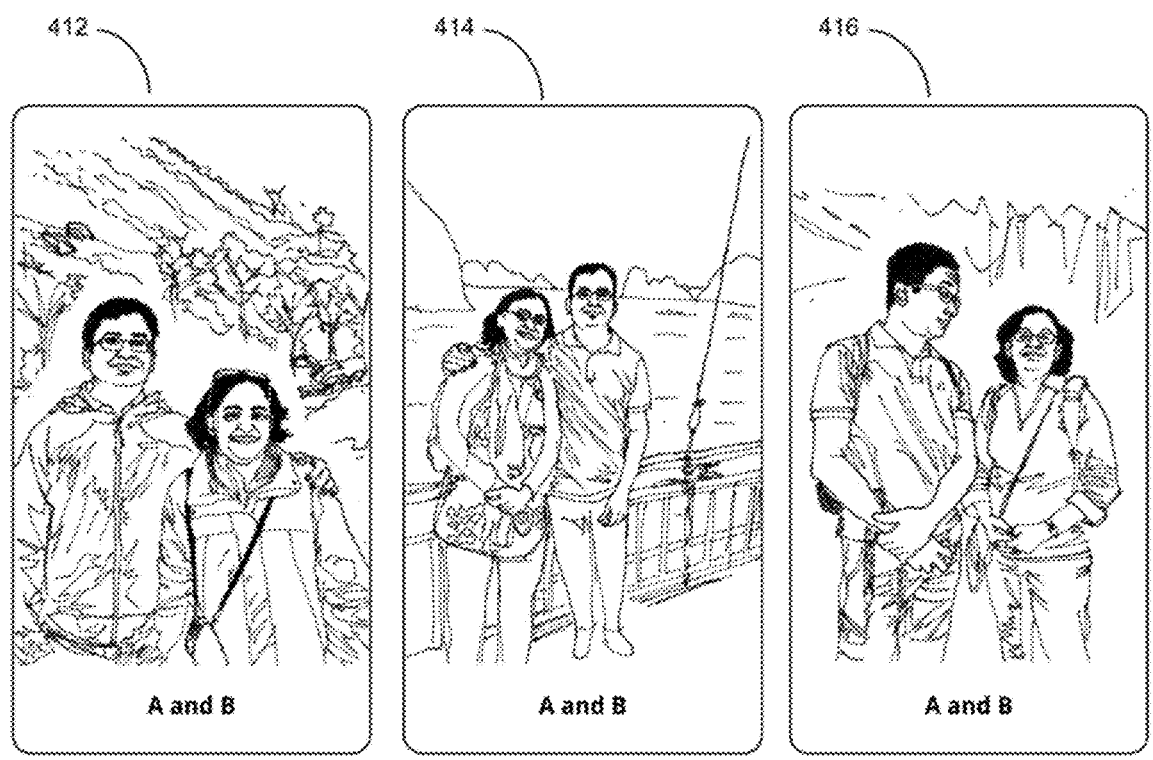
FIG. 4B illustrates example user interfaces, according to some implementations.

For example, in FIG. 4B, title 404 is "A and B" indicating that the image-based creation is based on a people group that includes persons A and B. In some implementations, e.g., when the people group is large or when one or more person names are not available, title 404 may indicate a subset of names, e.g., "A, B, and friends." In some implementations, title 404 may be generated based on the subset of images that is included in the image-based creation.

Actionable user interface (UI) element 402 may be selectable by a user, e.g., via a tap on a touchscreen, mouse click, or other type of input. In response to selection of the actionable user interface element 402, a corresponding image-based creation may be displayed to the user, as illustrated in FIG. 4B.

FIG. 4B illustrates example user interfaces 412-416. User interfaces (UIs) 412-416 together display the image-based creation. For example, when the image-based creation is a slideshow that includes three images associated with the particular people group that includes persons A and B, the images may be shown sequentially. For example, UI 412 that includes a first image of the image-based creation may be displayed for a first amount of time, followed by UI 414 that includes a second image for a displayed for a second amount of time, followed by UI 416 that includes a third image displayed for a third amount of time. In some implementations, each of UI 412, 414, and 416 may include a same title (same as title 404 of FIG. 4A), or a respective title for the image displayed in the UIs 412-416. In some implementations, no title may be displayed in UIs 412-416. Images in the image-based creation may be arranged in various sequential orders, e.g., reverse chronological, chronological, by number of persons, exact matches to the people group followed by partial matches, or any other order. As can be seen, images in the three UIs depict the same two individuals A and B.

Figure 5:
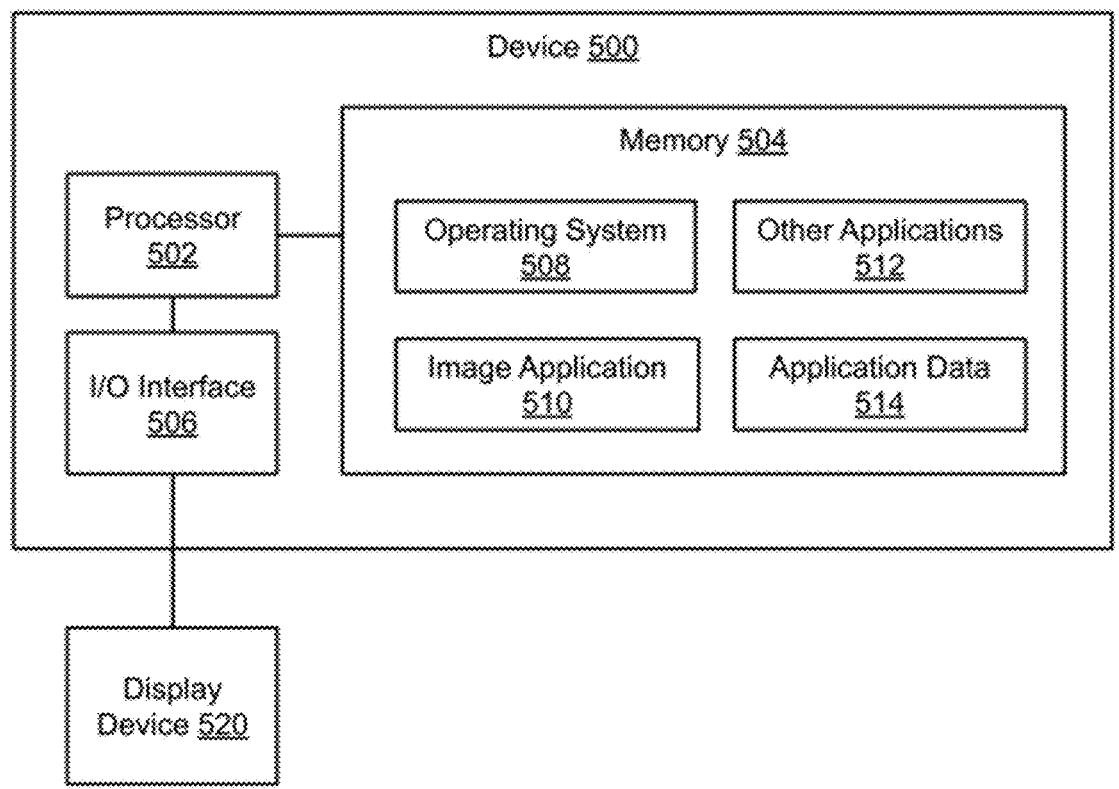
FIG. 5 is a block diagram of an example computing device which may be used to implement one or more features described herein.

FIG. 5 is a block diagram of an example device 500 which may be used to implement one or more features described herein. In one example, device 500 may be used to implement a client device, e.g., any of client devices 120-126 shown in FIG. 1. Alternatively, device 500 can implement a server device, e.g., server device 104. In some implementations, device 500 may be used to implement a client device, a server device, or both client and server devices. Device 500 can be any suitable computer system, server, or other electronic or hardware device as described above.

One or more methods described herein can be run in a standalone program that can be executed on any type of computing device, a program run on a web browser, a mobile application ("app") run on a mobile computing device (e.g., cell phone, smart phone, tablet computer, wearable device (wristwatch, armband, jewelry, headwear, virtual reality goggles or glasses, augmented reality goggles or glasses, head mounted display, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

In some implementations, device 500 includes a processor 502, a memory 504, and input/output (I/O) interface 506. Processor 502 can be one or more processors and/or processing circuits to execute program code and control basic operations of the device 500. A "processor" includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, a special-purpose processor to implement neural network model-based processing, neural circuits, processors optimized for matrix computations (e.g., matrix multiplication), or other systems. In some implementations, processor 502 may include one or more co-processors that implement neural-network processing. In some implementations, processor 502 may be a processor that processes data to produce probabilistic output, e.g., the output produced by processor 502 may be imprecise or may be accurate within a range from an expected output. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 504 is typically provided in device 500 for access by the processor 502, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 502 and/or integrated therewith. Memory 504 can store software operating on the server device 500 by the processor 502, including an operating system 508, image application 510 (e.g., which may be the same as image application 106 of FIG. 1) other applications 512, and application data 514. Other applications 512 may include applications such as a data display engine, web hosting engine, map application, image display engine, notification engine, social networking engine, etc. In some implementations, the image application 510 can include instructions that enable processor 502 to perform functions described herein, e.g., some or all of the method of FIG. 2.

Other applications 512 can include, e.g., map applications, image editing applications, media display applications, communication applications, web hosting engines or applications, media sharing applications, etc. One or more methods disclosed herein can operate in several environments and platforms, e.g., as a stand-alone computer program that can run on any type of computing device, as a web application having web pages, as a mobile application ("app") run on a mobile computing device, etc.

Any of software in memory 504 can alternatively be stored on any other suitable storage location or computer-readable medium. In addition, memory 504 (and/or other connected storage device(s)) can store one or more messages, one or more taxonomies, electronic encyclopedia, dictionaries, digital maps, thesauruses, knowledge bases, message data, grammars, user preferences, and/or other instructions and data used in the features described herein. Memory 504 and any other type of storage (magnetic disk, optical disk, magnetic tape, or other tangible media) can be considered "storage" or "storage devices."

I/O interface 506 can provide functions to enable interfacing the server device 500 with other systems and devices. Interfaced devices can be included as part of the device 500 or can be separate and communicate with the device 500. For example, network communication devices, storage devices (e.g., memory and/or database), and input/output devices can communicate via I/O interface 506. In some implementations, the I/O interface can connect to interface devices such as input devices (keyboard, pointing device, touchscreen, microphone, camera, scanner, sensors, etc.) and/or output devices (display devices, speaker devices, printers, motors, etc.).

Some examples of interfaced devices that can connect to I/O interface 506 can include one or more display devices 520 that can be used to display content, e.g., images, video, and/or a user interface of an application as described herein. Display device 520 can be connected to device 500 via local connections (e.g., display bus) and/or via networked connections and can be any suitable display device. Display device 520 can include any suitable display device such as an LCD, LED, or plasma display screen, CRT, television, monitor, touchscreen, 3-D display screen, or other visual display device. Display device 520 may also act as an input device, e.g., a touchscreen input device. For example, display device 520 can be a flat display screen provided on a mobile device, multiple display screens provided in glasses or a headset device, or a monitor screen for a computer device.

The I/O interface 506 can interface to other input and output devices. Some examples include one or more cameras which can capture images and/or detect gestures. Some implementations can provide a microphone for capturing sound (e.g., as a part of captured images, voice commands, etc.), a radar or other sensors for detecting gestures, audio speaker devices for outputting sound, or other input and output devices.

For ease of illustration, FIG. 5 shows one block for each of processor 502, memory 504, I/O interface 506, and software blocks 508, 510, and 512. These blocks may represent one or more processors or processing circuitries, operating systems, memories, I/O interfaces, applications, and/or software modules. In other implementations, device 500 may not have all of the components shown and/or may have other elements including other types of elements instead of, or in addition to, those shown herein. While some components are described as performing blocks and operations as described in some implementations herein, any suitable component or combination of components of environment 100, device 500, similar systems, or any suitable processor or processors associated with such a system, may perform the blocks and operations described.

Methods described herein can be implemented by computer program instructions or code, which can be executed on a computer. For example, the code can be implemented by one or more digital processors (e.g., microprocessors or other processing circuitry) and can be stored on a computer program product including a non-transitory computer-readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

Although the description has been described with respect to particular implementations thereof, these particular implementations are merely illustrative, and not restrictive. Concepts illustrated in the examples may be applied to other examples and implementations.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

The invention claimed is:

1. A computer-implemented method comprising:
obtaining a plurality of episodes, wherein each episode is associated with a corresponding time period, and includes a respective set of images and person identifiers for each image in the respective set of images;
forming a plurality of clusters that includes a respective cluster for each episode, wherein each cluster includes at least two person identifiers;
merging identical clusters to obtain a plurality of people groups, wherein each people group includes two or more person identifiers and wherein each people group is distinct from other people groups in the plurality of people groups;
after the merging, determining that at least one people group appears in a number of episodes of the plurality of episodes that is less than a threshold number;
in response to determination that at least one people group appears in the number of episodes that is less than the threshold number, combining the at least one people group with one or more other people groups, wherein the one or more other people groups each include a subset of the person identifiers included in the at least one people group; and
after the combining, providing a user interface that includes an image-based creation that includes one or more images that depict persons from a particular people group of the plurality of people groups.

2. The computer-implemented method of claim 1, wherein forming the plurality of clusters comprises, for each cluster:
- mapping, to the cluster, all person identifiers that appear in at least one image in the set of images of the episode associated with the cluster;
- determining a most frequent person identifier for the episode, wherein the most frequent person identifier appears in more images of the set of images of the episode than all other identifiers of the person identifiers;
- determining a number of images from the set of images of the episode that include the most frequent person identifier for the episode;
- determining a threshold image number based on the number of images that include the most frequent person identifier for the episode; and
- removing, from the cluster, person identifiers that only appear in a number of images of the cluster that is less than the threshold image number.

3. The computer-implemented method of claim 1, wherein combining the at least one people group with the one or more other people groups includes associating episodes associated with the at least one people group with the one or more other people groups.

4. The computer-implemented method of claim 1, wherein the threshold number is a threshold episode number, and the method further comprises:
- determining a threshold cluster number;
- determining whether one or more person identifiers are included in a number of clusters of the plurality of clusters that is less than the threshold cluster number; and
- if it is determined that the one or more person identifiers are included in the number of clusters that is less than the threshold cluster number, removing the one or more person identifiers from the clusters included in the number of clusters.

5. The computer-implemented method of claim 1,
- wherein merging the identical clusters comprises associating, based on the clusters, a respective set of episodes to each of the plurality of people groups, and
- wherein providing the image-based creation comprises selecting a subset of images for the image-based creation from the respective sets of images included in the episodes associated with the particular people group, wherein each image in the subset of images depicts persons that correspond to at least two of the two or more person identifiers included in the particular people group.

6. The computer-implemented method of claim 1, wherein providing the user interface includes displaying at least one actionable user interface element in response to at least one selected from the group of:
- detecting that an image that matches the particular people group was captured after a previous time that the at least one actionable user interface element was displayed,
- detecting that a current date at a time of providing the user interface matches a date associated with the particular people group, and
- combinations thereof.

7. The computer-implemented method of claim 1, wherein the time periods of the plurality of episodes are non-overlapping.

8. The computer-implemented method of claim 1, wherein providing the user interface that includes the image-based creation comprises:
- selecting a subset of images for the image-based creation based on the particular people group, wherein each image in the subset of images depicts persons that correspond to at least two of the two or more person identifiers included in the particular people group; and
- generating the image-based creation based on the subset of images.

9. The computer-implemented method of claim 8, wherein each image in the subset of images depicts persons that correspond to the two or more person identifiers included in the particular people group.

10. The computer-implemented method of claim 8, wherein each image in the subset of images depicts persons that correspond to the two or more person identifiers included in the particular people group and at least one image in the subset of images depicts one or more additional persons that are not included in any other people group.

11. The computer-implemented method of claim 8, wherein the subset of images includes images from at least two episodes of the plurality of episodes.

12. The computer-implemented method of claim 11, wherein the subset of images is selected such that the subset provides one or more selected from the group of:
- location diversity in which images captured at a plurality of two or more locations are included in the subset of images,
- visual diversity in which multiple different types of objects are depicted in the subset of images, and
- combinations thereof.

13. A non-transitory computer-readable medium with instructions stored thereon that, when executed by a processor, cause the processor to perform operations comprising:
- obtaining a plurality of episodes, wherein each episode is associated with a corresponding time period, and includes a respective set of images and person identifiers for each image in the respective set of images;
- forming a plurality of clusters that include a respective cluster for each episode, wherein each cluster includes at least two person identifiers;
- merging identical clusters to obtain a plurality of people groups, wherein each people group includes two or more person identifiers and wherein each people group is distinct from other people groups in the plurality of people groups;
- after the merging, determining that at least one people group appears in a number of episodes of the plurality of episodes that is less than a threshold number;
- in response to determination that at least one people group appears in the number of episodes that is less than the threshold number, combining the at least one people group with one or more other people groups, wherein the one or more other people groups each include a subset of the person identifiers included in the at least one people group; and
- providing a user interface that includes an image-based creation that includes one or more images that depict persons from a particular people group of the plurality of people groups.

14. The non-transitory computer-readable medium of claim 13, wherein forming the respective cluster for each episode comprises:
- mapping, to the respective cluster, all person identifiers that appear in at least one image in the set of images of the episode associated with the respective cluster;

determining a most frequent person identifier for the episode, wherein the most frequent person identifier appears in more images of the set of images of the episode than all other identifiers of the person identifiers;

determining a number of images from the set of images of the episode that include the most frequent person identifier for the episode;

determining a threshold image number based on the number of images that include the most frequent person identifier for the episode; and removing, from the respective cluster, person identifiers that only appear in a number of images of the respective cluster that is less than the threshold image number.

15. The non-transitory computer-readable medium of claim 14, wherein providing the user interface that includes the image-based creation comprises:

selecting a subset of images for the image-based creation based on the particular people group, wherein each image in the subset of images depicts persons that correspond to at least two of the two or more person identifiers included in the particular people group; and generating the image-based creation based on the subset of images.

16. A computing device comprising:

a processor; and a memory coupled to the processor, with instructions stored thereon that, when executed by the processor, cause the processor to perform operations comprising:

obtaining a plurality of episodes, wherein each episode is associated with a corresponding time period, and includes a respective set of images and person identifiers for each image in the respective set of images;

forming a plurality of clusters that include a respective cluster for each episode, wherein each cluster includes at least two person identifiers;

merging identical clusters to obtain a plurality of people groups, wherein each people group includes two or more person identifiers and wherein each people group is distinct from other people groups in the plurality of people groups;

after the merging, determining that at least one people group appears in a number of episodes of the plurality of episodes that is less than a threshold number; and in response to determination that at least one people group appears in the number of episodes that is less than the threshold number, combining the at least one people group with one or more other people groups, wherein the one or more other people groups each include a subset of the person identifiers included in the at least one people group; and after the combining, providing a user interface that includes an image-based creation that includes one or more images that depict persons from a particular people group of the plurality of people groups.

17. The computing device of claim 16, wherein the operation of forming the plurality of clusters comprises, for each cluster:

mapping, to the cluster, all person identifiers that appear in at least one image in the set of images of the episode associated with the cluster;

determining a most frequent person identifier for the episode, wherein the most frequent person identifier appears in more images of the set of images of the episode than all other identifiers of the person identifiers;

determining a number of images from the set of images of the episode that include the most frequent person identifier for the episode;

determining a threshold image number based on the number of images that include the most frequent person identifier for the episode; and removing, from the cluster, person identifiers that only appear in a number of images of the cluster that is less than the threshold image number.

18. The computing device of claim 16, wherein the memory has further instructions stored thereon that, when executed by the processor, cause the processor to perform operations comprising:

determining a threshold cluster number;

determining whether one or more person identifiers are included in a number of clusters of the plurality of clusters that is less than the threshold cluster number; and if it is determined that the one or more person identifiers are included in the number of clusters that is less than the threshold cluster number, removing the one or more person identifiers from the clusters included in the number of clusters.

19. The computing device of claim 16, wherein the operation of combining the at least one people group with the one or more other people groups includes associating episodes associated with the at least one people group with the one or more other people groups.

20. The computing device of claim 16, wherein the operation of providing the user interface that includes the image-based creation comprises:

selecting a subset of images for the image-based creation based on the particular people group, wherein each image in the subset of images depicts persons that correspond to at least two of the two or more person identifiers included in the particular people group; and generating the image-based creation based on the subset of images.

* * * * *